B. C. STICKNEY.
COMBINED TYPEWRITING AND COMPUTING MACHINE.
APPLICATION FILED DEC. 10, 1917.

1,356,177.

Patented Oct. 19, 1920.
6 SHEETS—SHEET 1.

Witnesses:

Inventor:

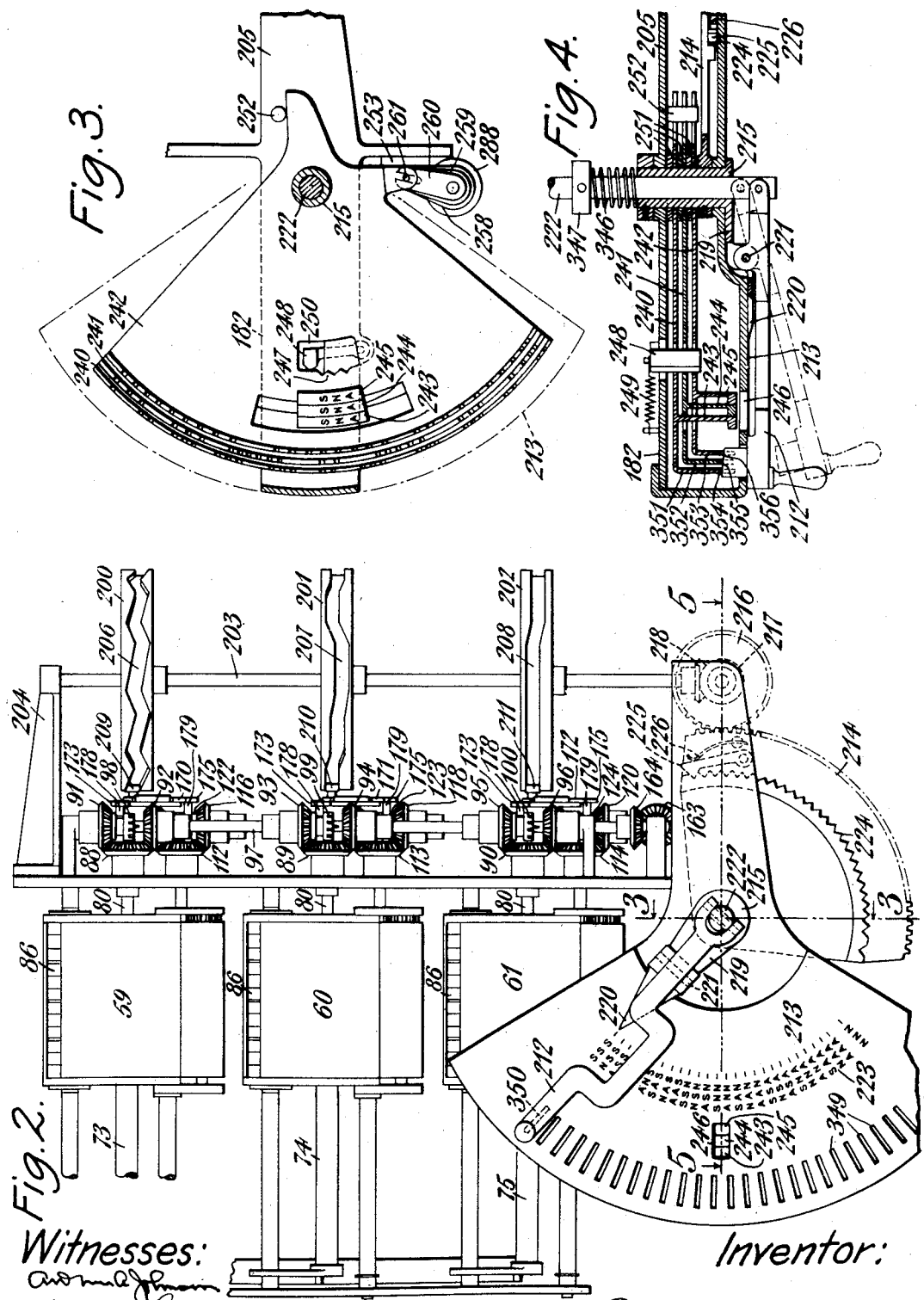

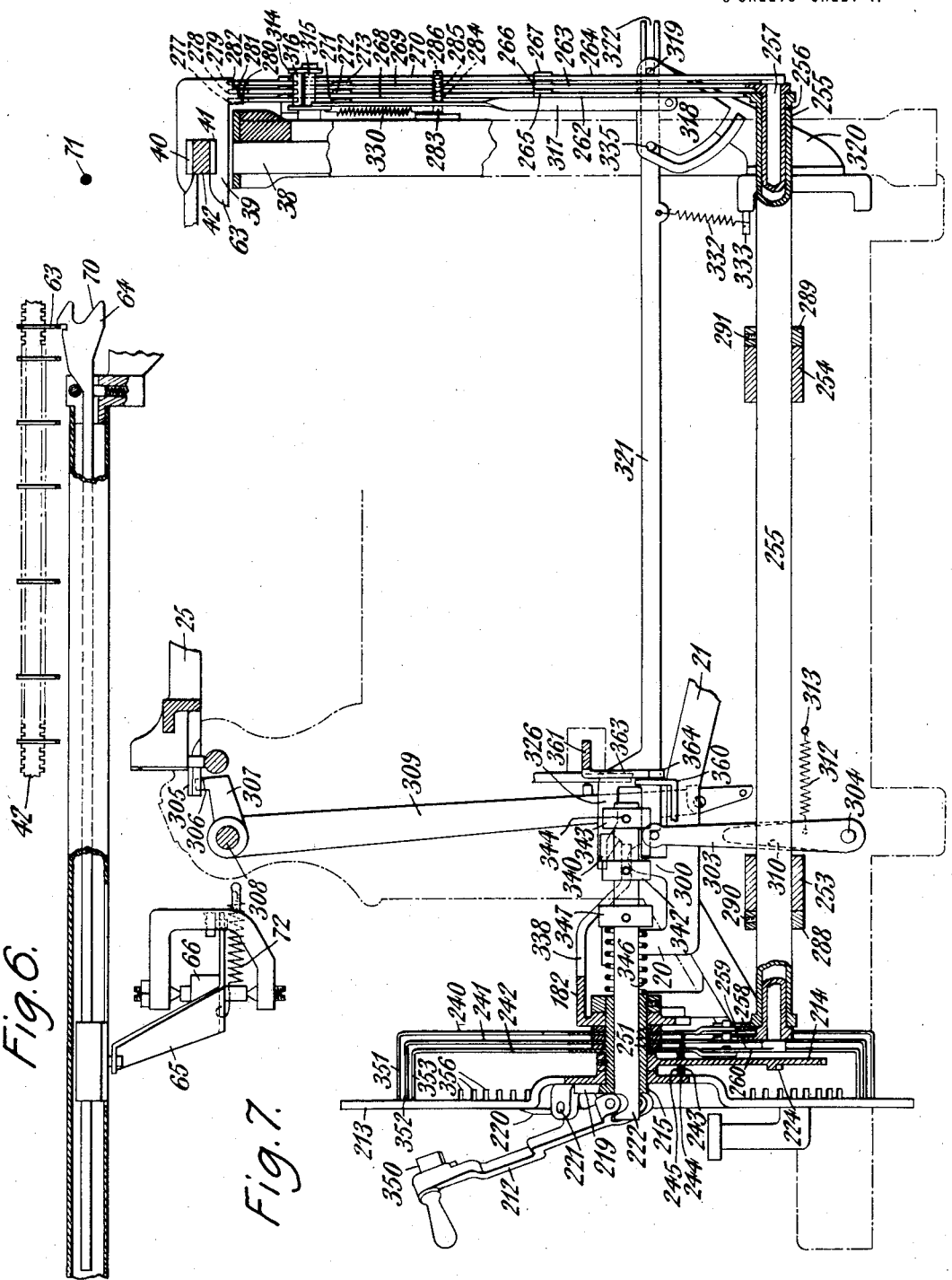

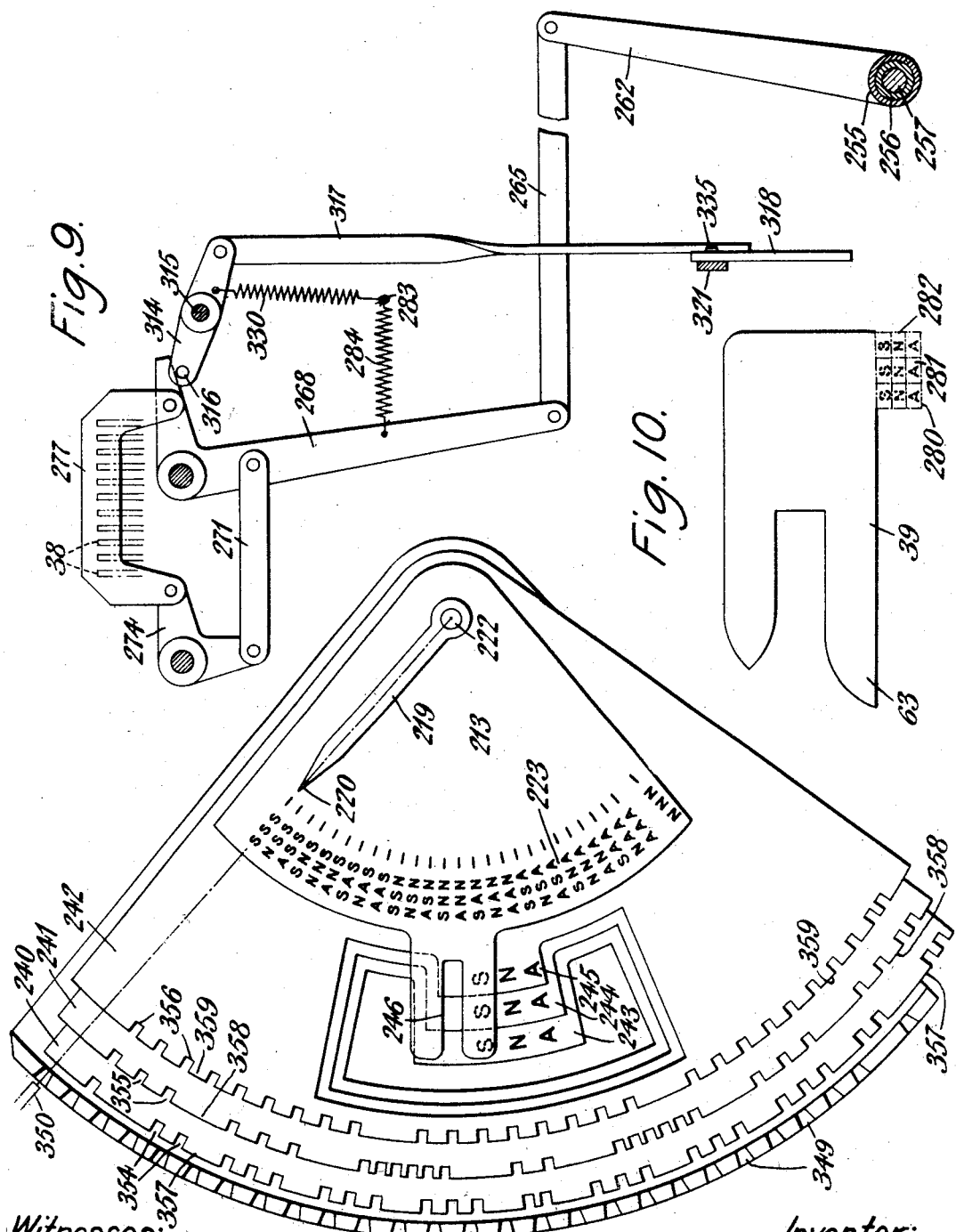

B. C. STICKNEY.
COMBINED TYPEWRITING AND COMPUTING MACHINE.
APPLICATION FILED DEC. 10, 1917.
1,356,177.
Patented Oct. 19, 1920.
6 SHEETS—SHEET 6.
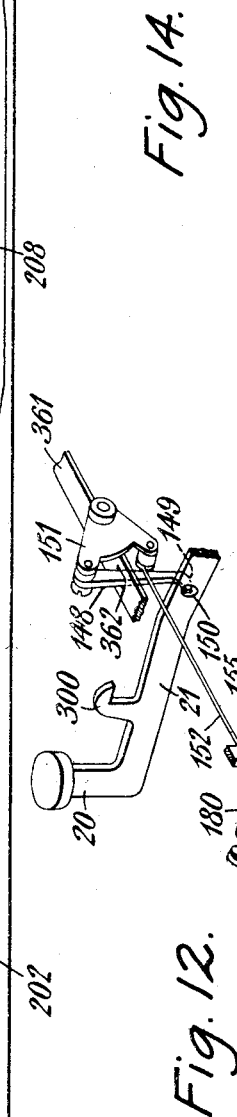
Fig. 11.
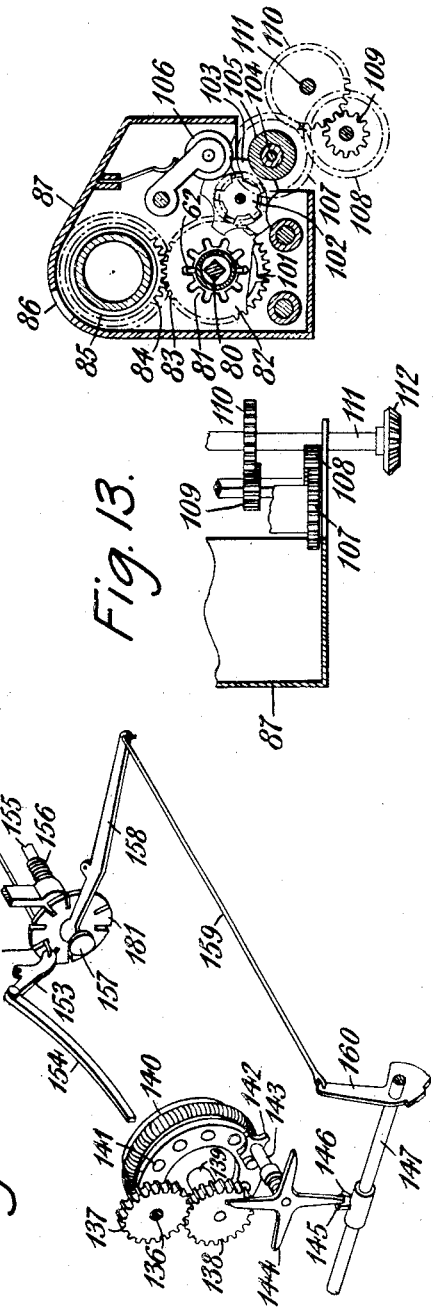
Fig. 14.
Fig. 13.
Fig. 12.
Witnesses:
Inventor:
Burnham C. Stickney

UNITED STATES PATENT OFFICE.

BURNHAM C. STICKNEY, OF ELIZABETH, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,356,177.     Specification of Letters Patent.     Patented Oct. 19, 1920.

Application filed December 10, 1917. Serial No. 206,406.

*To all whom it may concern:*

Be it known that I, BURNHAM C. STICKNEY, a citizen of the United States, residing in Elizabeth, in the county of Union and State of New Jersey, have invented certain new and useful Improvements in Combined Typewriting and Computing Machines, of which the following is a specification.

This invention relates to improvements in computing machines, and is illustrated as applied to a combined typewriting and computing machine of the type disclosed in Patent No. 1,237,008, issued to Wright & Degener on August 14, 1917, although it is to be understood that the invention is in no manner limited in its application to machines of that particular design.

Machines of the type disclosed in the above-mentioned patent comprise, in general, computing mechanism including computing wheels and a master wheel, relatively movable with respect thereto, in accordance with the letter-spacing movement of the typewriter carriage. By such relative movement, the master wheel is brought into coöperative relation with the various computing wheels in succession, so that numbers printed on the typewriter may be accumulated thereby; means being provided as a result of which the master wheel is rotated at each operation of a numeral key to an extent corresponding to the digit represented by said key.

The particular embodiment of the invention, herein disclosed, involves computing mechanism including three computing heads, each of which is settable to three different states, that is, to add, to subtract, or to remain neutral. A locking device is provided for the numeral keys, said device being controlled by operating mechanism adapted to render the same effective to lock said keys whenever the typewriter carriage enters a computing zone. A mechanism for indicating to the operative, in accordance with various permutations, which may be selectively predetermined, the different states to which the computing heads may be set for each computing zone, is also controlled by the letter-spacing movement of the carriage, so as to be rendered effective whenever the carriage enters one of said zones. A state-setting device is provided, by means of which the various computing heads may be set in accordance with the states registered by the indicating mechanism, and a releasing device for the key-locking device is so controlled in its operation, by both the state-indicating device and the state-setting device, that the numeral keys, having been once locked by the travel of the carriage into a particular computing zone, may not be unlocked without first setting the computing heads in accordance with the predetermined permutation of states as registered by the indicating device. Means is also provided for disconnecting the numeral keys from the computing mechanism, and for rendering the key-locking device ineffective when said keys are disconnected thereby.

The mechanism may include means, controlled by the travel of the carriage into any one of a number of predetermined computing zones, for indicating to an operative a particular permutation of states which may be selectively predetermined, and in accordance with which it is desired to have a number of computing heads set for said zone.

The mechanism may also include means, controlled by the travel of the carriage into any one of a number of predetermined computing zones, for locking the numeral keys, and, at the same time, indicating to an operative a particular permutation of states, which may be selectively predetermined, and in accordance with which a number of computing heads must be set before said keys may be unlocked.

The mechanism is herein illustrated as including a permutation state-setting device for selectively setting three computing heads, each settable to three different states, in accordance with all the possible permutations of the states represented.

It may also include key-locking means, state-indicating means, and state-setting means, for the above-mentioned purposes, combined with lock-releasing means controlled in its operation by the relative positions of parts of said state-setting and state-indicating means.

The invention may be embodied in a machine, having means for disconnecting the numeral keys from the computing mechanism, with means for locking said keys when the carriage enters a computing zone, said locking means being rendered ineffective when said key-disconnecting means is operated to disconnect said keys.

Other features and advantages will hereinafter appear.

In the accompanying drawings,

Fig. 2 is a front view of parts of the same machine.

Fig. 3 is a front view of the state-indicator, parts being omitted.

Fig. 4 is a sectional view of the state-indicator, shown in Fig. 2, the controller-handle for the state-setting device and for the lock-releasing device also being shown.

Fig. 6 is a fragmentary view of parts of the mechanism for causing the master wheel to travel concomitantly with the carriage throughout predetermined zones.

Fig. 7 is a fragmentary, sectional, side view, parts of the machine being shown in broken lines and parts being omitted.

Fig. 8 is a diagrammatic view of parts of the state-indicator; showing also the lock-out elements for the lock-releasing device, and the indicator-scale and index for determining the position of the state-setting device.

Fig. 9 is a front view, drawn to a larger scale, of parts of the operating mechanism for the state-indicator and key-locking devices.

Fig. 10 is a diagrammatic view of a tabulator column-stop, indicating, in broken lines, various relative positions in which operating surfaces or tappets may be added thereto to form an index for predetermining different permutations of states to be registered on the indicator.

Fig. 11 is a diagrammatic view showing the form and relative arrangement of the cams on the three cam-carrying disks of the state-setting device.

Fig. 12 is a fragmentary, perspective view, showing the key-controlled valuating mechanism for the computing machine.

Fig. 13 is a diagram, indicating the gearing for the tens-carrying mechanism.

Fig. 14 is a sectional view of one of the computing heads, shown in front view in Fig. 1.

Figure 1:
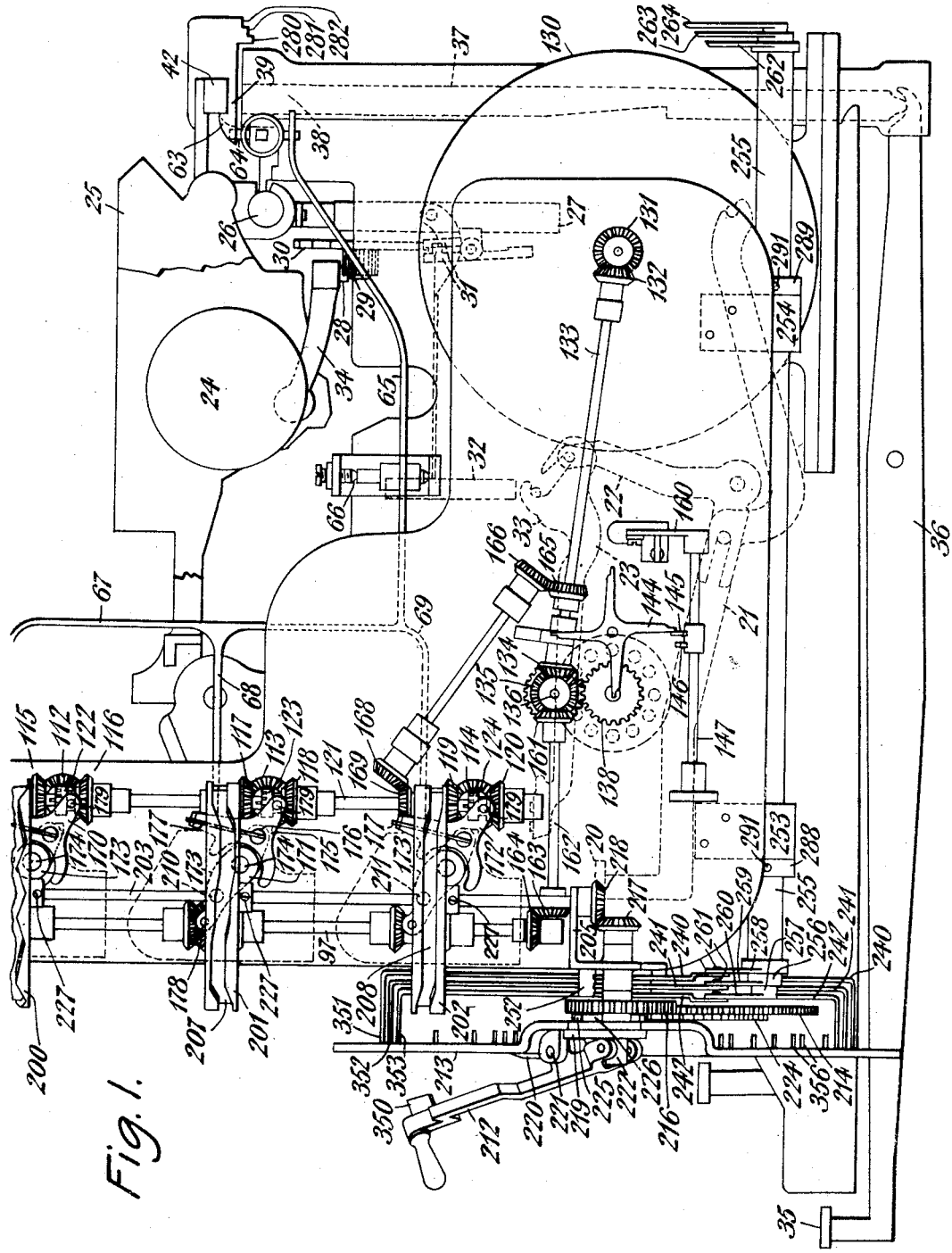
Figure 1 is a side view of a combined typewriting and computing machine, with the invention applied thereto, certain parts being omitted.

Referring to the various figures of the drawings, in which like reference characters designate like parts, the invention is disclosed as applied to a typewriter (Fig. 1) having keys including numeral keys 20 by which levers 21 may be depressed to rock bell-cranks 22 to swing type-bars 23 and cause their type to strike rearwardly against the front side of a platen 24. Said platen is mounted on a carriage 25 running on tracks, one of which is designated 26, said carriage being spring-urged in one direction by a spring and spring-barrel 27. Said carriage has a rack 28 meshing with a pinion 29, connected by the usual one-way pawls (not shown) to an escapement wheel 30, controlled by escapement dogs 31. Said escapement dogs are reciprocated by a universal bar 32, which is engaged and moved at each operation of a type-key, the type-bar of each key being provided with a heel 33 for such purpose. The rack 28 is hung on arms 34, pivotally connected to the carriage 25, so that it may be lifted from the pinion 29 to release the carriage.

Tabulator keys 35 are provided, said keys being mounted upon levers 36, which, at their rear ends, engage stop-rods 37, having decimal stops 38 at their upper ends. Said decimal stops 38 coöperate with adjustable column-stops 39, said column-stops being inserted, as required, in notches 40, 41, formed, respectively, in the top and bottom of a bar 42, carried by the carriage 25. Each decimal stop-rod is provided with means (not shown) for lifting the rack-bar 28 from the escapement pinion 29 whenever a tabulator key 35 is depressed.

The typewriter and tabulator mechanisms, thus far briefly described, are in common use in the Underwood typewriter as sold to and used by the trade, and need not, therefore, be herein set forth with greater particularity.

In a machine of the type in connection with which the invention is herein disclosed, it is necessary to provide means for producing relative step-by-step motion between the master wheel and the computing wheels, in accordance with the letter-spacing movement of the typewriter carriage. In this instance, the master wheel has been selected as the traveling element. The machine is provided with three computing heads, designated, respectively, 59, 60 and 61, (Fig. 2), each of which is provided with a master wheel 62 (Fig. 14). The means for causing the master wheels to move in accordance with the letter-spacing movement of the carriage may be controlled by tappets which may be adjustably attached to a notched bar carried by the carriage. As herein disclosed, the bar used for this purpose is the same bar 42 which has been described as a part of the tabulator mechanism, and the tappets are mere extensions 63 of the tabulator column-stops 39, (Fig. 1). Each of the tappets 63, of which there may be one or more, is brought into engagement, during the travel of the carriage in letter-spacing direction, with a spring-pressed latch 64, (Fig. 6), connected to one end of a lever 65, (Fig. 1), which is pivotally mounted intermediate its ends on the machine frame, at 66. The opposite end of the lever 65 may be divided into three branches, 67, 68 and 69, (Fig. 1), each of which may be connected, through a suitable pin-and-slot connection, with one of the slidably-mounted sleeves 73, 74 and 75, (Fig. 2), for reciprocating the master wheels of the computing heads 59, 60 and 61, respectively. By suitably placing the tappets 63 with respect to the bar 42, the relative positions of the computing zones, with respect to a work-piece carried by the typewriter platen, may be predetermined, since the point in the movement of the carriage, at which the master wheel will commence its movement therewith, will be determined by the engagement of one of said tappets with the latch 64.

To permit the lever 65 to return the master wheels to their normal positions, after they have advanced through a computing zone to their engaging relation with respect to the computing wheels of lowest denomination of their respective computing heads, the latch 64 is provided with a cam surface 70 to engage a pin 71, fixed with respect to the machine frame, for releasing the latch from the tappets 63, said lever 65 being provided with a spring 72 to return and hold the same in normal position. The above-described means for causing the master wheel to move concomitantly with the typewriter carriage in letter-spacing direction is not, *per se*, an invention of this applicant, the same being disclosed and claimed in a Patent No. 1,244,398, granted to Walter Wright, on October 23, 1917. This part of the mechanism, being fully illustrated and described in said patent, need not be set forth with greater particularity in this case.

The computing heads and carry-over mechanism, herein disclosed, are of the type illustrated and described in the British patent to Walter Wright, No. 8740 of 1909, and need, therefore, be but briefly described here. Inasmuch as the three computing heads 59, 60 and 61 are identical in construction and operation, it will be neceesary to describe but one. Each computing head (see Fig. 14) includes a master wheel 62 mounted on a master-wheel shaft 80, so as to rotate therewith and yet be capable of sliding longitudinally, so as to bring the teeth thereon successively into engaging relation with internal gears 81, consisting of inwardly-projecting teeth on a series of computing wheels 82, located along the shaft 80 and concentric therewith. The computing wheels 82 are also provided with external teeth, forming gears 83, which mesh with corresponding gears 84, carrying number-bearing dials or wheels 85, which are adapted to exhibit the numbers thereon as they are turned to register with the aperture 86 in the computing-head casing 87. Each of the three master-wheel shafts 80 is provided at its outer extremity with a beveled gear 88, 89, 90, (Fig. 2), from whence it receives its motion. Each of said beveled gears receives its motion from one or the other of a pair of beveled gears, there being three such pairs, comprising the six gears 91 to 96, inclusive, (Fig. 2). These six gears are loosely mounted upon a shaft 97, to which they are adapted to be connected by two-faced clutches 98, 99 and 100, there being one such clutch for each pair of gears. Each of said clutches is splined to the shaft 97, so as to rotate therewith, but to have a sliding movement, in order that it may be brought into engagement with either gear of the pair with which it is associated. Each clutch may also be moved to an intermediate position in which it will be free from engagement with either of its associated gears. The means for driving the shaft 97 and for controlling the operation of the clutches 98 to 100, inclusive, will hereinafter be described.

In order that each of the computing wheels 82, when moved from "9" to "0", or from "0" to "9", may advance the computing wheel of next higher order one step in the same direction, each of said computing wheels is provided with a single carrying tooth 101, which is adapted, at each movement of said computing wheel between its "9" and "0" positions, to engage with one of five equally-spaced teeth on the transfer-wheel 102, to impart to said wheel an initial carry-over movement. Carried by said transfer-wheel is a series of five equally-spaced projections 103, separated by arc-shaped depressions, and a gear (not shown) which meshes with a gear of the computing wheel of next higher order. Mounted to rotate about an axis parallel with the axis of said transfer-wheels 102, is a shaft 104, carrying a cylinder 105 of elastic material, such as rubber, the surface of said cylinder normally lying along a series of said arc-shaped depressions in the transfer-wheels, so as to be normally out of contact with the projections 103. At each computing operation, the cylinder 105 is caused to rotate, by means which will hereinafter be described, and to coöperate with said transfer-wheels to complete any carry-over operations initiated by the carry-over teeth 101 in the following manner. On the initial rotation of a transfer-wheel 102 by one of said teeth 101, one of the projections 103 of said transfer-wheel is caused to crush into the cylinder 105, the rotation of which is then communicated to the transfer-wheel and thence, by the gear which it carries, to the computing wheel of next higher order, to impart thereto one full step. A roller-detent 106 may be provided for preventing overthrow and for holding the transfer-wheel in such position as to insure the proper registration of one of the characters on the number-wheel with the sight-opening 86.

In order to impart to the elastic cylinder 105, at each computing operation, a sufficient rotation to effect the completion of initiated carry-over operations in the above-described manner, the shaft carrying said cylinder is provided with a gear 107 (Figs. 13 and 14), which meshes with a gear 108, carried by a shaft having fast thereon a gear 109, meshing with a gear 110 on the shaft 111. Each of the three carry-over driving shafts 111 is provided with a beveled gear, said gears being designated 112, 113 and 114, (see Fig. 1). Each of said beveled gears is driven, at each computing operation, by one or the other of a pair of beveled gears, there being three such pairs, comprising six gears, designated by the reference characters 115 to 120, inclusive. The last-mentioned gears are loosely mounted on a shaft 121, from which they are driven by means of two-faced clutches 122, 123, 124, there being one such clutch for each pair of gears. Each of said clutches 122, 123 and 124 is splined to the shaft 121, so as to rotate therewith, but has a sliding movement to provide for bringing it into a driving relation with one or the other of its associated pair of gears, or in a position free from both, in a manner similar to the driving connections between the clutches 98 to 100 and the beveled gears 91 to 96, inclusive.

The shafts 97 and 121 (Fig. 1) may be driven from a constantly-rotating motor 130, connected by means of a friction coupling (not shown), with a beveled gear 131 meshing with a beveled gear 132 on a shaft 133. The shaft 133 is connected to drive a shaft 162 through the intermediary of the three beveled gears 134, 135 and 161. The shaft 97 is driven from the shaft 162 through the intermediary of the beveled gears 163 and 164. Connected to the shaft 133 is a beveled gear 165, meshing with a beveled gear 166 on a shaft 167, from which the shaft 121 is driven through the intermediary of intermeshing beveled gears 168 and 169.

Although the shaft 133 has a constant tendency to rotate as a result of its connection through the aforesaid friction coupling with the constantly-rotating motor 130, said shaft and the parts driven thereby are permitted to rotate only as a result of the operation of one of the numeral keys 20, and for a period proportional, at each such operation, to the digit represented by the numeral key operated. The means for thus controlling the rotation of the shaft 133, and the mechanism driven thereby, is fully disclosed in the aforesaid Patent, No. 1,237,008, and, therefore, need be but briefly described here.

The beveled gear 135 (Fig. 1), which meshes with the beveled gears 134 and 161, is mounted on a shaft 136, having fast thereon a gear 137 (Fig. 12), meshing with a gear 138 fast on a shaft 139, on which is mounted a valuating or indexing wheel 140. Said valuating wheel 140 is provided with a series of index pins 141, slidably mounted therein and having a length somewhat greater than the width of said valuating wheel. Rotation of the valuating wheel is normally prevented by engagement of one of said pins with an escapement wheel 142, carried at one end of a shaft 143, having at the other end thereof a secondary escapement wheel 144, movement of which is normally prevented by engagement of one arm thereof with one of a pair of dogs 145, 146, carried by a rock-shaft 147. The pins 141 in the valuating wheel 140, with the exception of the one which engages the escapement wheel 142, are normally positioned so that one end of each pin is flush with the face of the valuating member adjacent said escapement wheel, the other ends of said pins projecting from the opposite surface of the valuating wheel.

Each of the numeral keys 20 (Fig. 12) is connected, by means of a link 148, having a hooked end 149 engaging with an opening 150 in the key-lever 21, to one arm of a bell-crank 151, the other arm of which is connected, by means of a link 152, with one arm of a lever 153, carrying at its outer end a jack 154, properly positioned when moved by said lever 153 to engage and move one of the pins 141 in the valuating wheel 140. Each of the links 152 passes through a slot 180 in a disk 181, mounted on a sliding bar 155 provided with a spring 156 for holding the same in its normal position and returning it thereto after each operation. Carried by the bar 155, at a slight distance in advance of the disk 181, is a head 157, providing a recess, within which rests one end of a lever 158, connected at its other end with a link 159, which, in turn, is connected with an arm 160 for rocking the shaft 147.

By means of the above-described mechanism, the depression of a numeral key 20 will rock its bell-crank 151, and, through its connection with the lever 153, project one of the jacks 154 to cause an endwise displacement of a pin 141, placed at an angular distance from the pin which is in engagement with the escapement wheel 142, corresponding to the digit represented by the particular numeral key depressed. The same operation of the key will, through engagement of the head 157, with the lever 158, rock the shaft 147, thus causing the dog 145 to move out of engagement with the arm of the auxiliary escapement wheel 144, and permit the same to move into engagement with the dog 146. This slight movement of the auxiliary escapement wheel is not sufficient to release the valuating wheel from its engagement with the escapement wheel 142. At the beginning of the upward movement of the numeral key, when released, the lever 158, through its engagement with the disk 181, which will be returned by the spring 156, will be rocked in the opposite direction, and, through its connection with the arm 160, will return the shaft 147 to its normal position, thus releasing the auxiliary escapement wheel 144 from the dog 146, and permitting a sufficient rotation of the escapement wheel 142, to release the valuating wheel 140 and permit it to rotate until the pin 141, which was displaced by the jack 154, engages a tooth of the escapement wheel 142. This rotation of the valuating wheel 140, through the above-described connections with the shafts 97 and 121, will cause a rotation of the master wheel of the computing mechanism proportional to the digit represented by the operated numeral key. During the rotation of the valuating wheel 140, which results from the depression of any of the nine numeral keys, the pin 141 which was displaced as a result of the last numeral key previously-depressed, and thus brought into engagement with the escapement wheel 142, is returned to its normal position, means, not shown, being provided for such purpose.

The clutches 98 to 100, inclusive, heretofore-described, are provided as a means for reversing the direction of rotation of the totalizer mechanisms, in order that the same may be used in computations involving either addition or subtraction. As already explained, these clutches may also be moved to an intermediate position, in which they will be free from engagement with either of the beveled gears with which they are associated, in which case the shaft 97 may rotate without imparting any movement to the totalizer wheels. The corresponding clutches 122 to 124, inclusive, are provided for the purpose of reversing the direction of rotation of the tens-carrying mechanisms simultaneously with that of the totalizer wheels. Each of these clutches may also be moved to an intermediate position, in which case the mechanism controlled thereby will be permitted to remain neutral. To control the operation of these clutches, there are provided composite levers 170, 171 and 172 (Fig. 1), one for each of the computing heads. As these levers are identical in their construction and operation, it will be necessary to describe but one. These composite levers, together with the clutches which they control constitute state-shifting mechanisms, individual to said computing heads, for setting said heads to add, to subtract, or to remain neutral.

In the form shown, each of the composite levers 170, 171, and 172, comprises a main lever 173 (Fig. 1), pivoted intermediate its ends at 174, and a supplementary lever 175, pivoted to the main lever at 176. The supplementary lever 175 has a limited movement relative to the main lever, which may be taken up by a spring 177. The main and supplementary levers, in the case of each composite lever, are provided, respectively, with pins 178 and 179, which engage grooves in the associated master-wheel and tens-carrying clutches, respectively, so that they may be simultaneously shifted to the proper relative positions corresponding with the different states to which the computing heads may be set.

For the purpose of simultaneously moving said state-shifting levers 170 to 172 to different relative positions, to set the computing heads 59 to 61, in accordance with various permutations of the different states to which they are adapted to be set, there is provided a permutation-state-setting device, comprising three cam disks 200, 201, 202 (Figs. 1 and 2), one for each computing head, said disks being fixedly attached to a common shaft 203, mounted in brackets 204, 205, supported from the machine frame. Said cam disks 200, 201, 202, may be secured to said shaft in any suitable manner, as by set-screws 227, providing convenient means of adjustment, each with respect to the others. Each of said cam disks is provided with a pair of cam surfaces, forming guiding grooves 206, 207, 208, which engage, respectively, pins 209, 210, 211, carried by said state-shifting levers.

As a means of imparting rotation to the above-described state-setting device, there is provided a controller-handle or finger-piece 212, connected by means of gearing, which will now be described, with the shaft 203. Mounted upon a bracket 182, (Fig. 4), forming a continuation of the bracket 205, is a face-plate or dial 213. A driving sector 214, fixedly attached to a hub 215 (Fig. 7), one end of which is mounted to rotate in the bracket 205, and the other end in the face-plate 213, is provided with teeth engaging with teeth of a gear-wheel 216, fast upon a shaft, mounted in said bracket 205, and having fixedly attached, so as to rotate therewith, a beveled gear 217, meshing with a beveled gear 218, fast upon the shaft 203.

Secured to the hub 215 (Fig. 2), is a radial arm 219, having a pointer or index 220, which moves in an arcuate path over the face of the dial-plate 213. The controller-handle 212 may be in the form of a lever, pivoted to the arm 219 at 221, the inner end of which is pivotally connected with a bar 222 (Figs. 4 and 5), slidingly mounted within the hollow hub 215. It will thus be seen that the controller-handle 212 serves as means for imparting rotary movement to the sector 214, and thence to the cam disks of the state-setting device, and, by a movement in a direction toward and away from the dial, serves as means for reciprocating the bar 222, for a purpose which will hereinafter be set forth.

The face of the dial-plate 213 is provided with an indicator-scale 223, having elements placed in the arc of a circle of a radius somewhat greater than the length of the index 220, so that on rotation of the state-setting device by the controller-handle 212, said index may be brought into registry with any one of the elements of said scale. The scale 223 comprises three arcuate rows of symbols (see diagram, Fig. 8), made up of the letters "S," "A" and "N," representing, respectively, the three states to which each of the computing heads is settable, that is, for substraction, for addition, or to remain neutral. The outermost row of symbols, as arranged on the scale, represents states to which the upper computing head 59 is to be set; the innermost row represents states to which the lower computing head 61 is to be set; and the intermediate row represents states to which the middle computing head 60 is to be set. These symbols may be, as shown by the diagram (Fig. 8), so varied in their arrangement that each group of three in a radial direction represents a different permutation of the relative states to which the three computing heads may be set, the twenty-seven such groups indicated representing all of the possible permutations for three heads and three states.

In Fig. 11 is shown three diagrams, one for each of the cam disks which control the movement of the state-shifting levers. Each of these diagrams represents the development of the guiding groove on its periphery, as viewed from the center of the disk. The points along the diagrams designated by the symbols or letters "S", "N" and "A" represent the relative positions of the pins 209, 210, 211, of the state-shifting levers, corresponding with the different positions to which the controller-handle may be moved to bring the index 220 (Fig. 8) into registry with different groups of symbols in the scale 223, the vertical rows of letters on the diagram, Fig. 11, corresponding with the radial rows on the diagram, Fig. 8.

It may be noted that the form of the guiding groove (Fig. 11) in each cam disk is such that on rotation of the state-setting device, the pin on the state-shifting lever will be moved from one to another of three different positions, an uppermost position, in which it will set its corresponding computing head for subtraction; a lowermost position, in which said computing head will be set for addition; and an intermediate position, in which said head will be set to remain neutral. The forms of the guiding grooves on the three cam disks are varied, one with respect to the other, in accordance with the arrangement of the symbols in the scale 223, and in the same order, so that, on movement of the controller-arm, such as to bring the index-pointer 220 into registry with one of the radial groups of symbols, representing a particular permutation of states, the state-setting device will be so moved as to bring into setting relation with the pins 209 to 211 of the state-shifting levers, those portions of the three guiding grooves represented by the corresponding vertical row of symbols on the diagram, Fig. 11, so as to set said computing heads in accordance with the particular permutation indicated on the scale. By moving the controller-handle to any particular permutation, as designated in the scale 223, therefore, the three computing heads may be correspondingly set.

As a means for holding the state-setting device, and parts controlled thereby, in any of the various positions to which they may be set, the driving sector 214 is provided with an arcuate series of notches 224, there being one such notch corresponding to each position of the index 220 with respect to the scale 223, and a detent 225, which may be mounted upon the under side of the face-plate 213, is held in yielding engagement with one of the notches 224 of said sector by means of a spring 226.

As a means of indictaing, to an operative, predetermined states to which it may be desired that the computing heads shall be set, whenever the carriage travels into a computing zone, a permutation-state-indicating device is provided, which will now be described. Mounted for rotation about the hub 215 of the state-setting mechanism, and behind the dial-plate 213, are three indicator-elements, in the form of sectors, 240, 241, 242, (Figs. 3, 4, 5 and 7), corresponding, respectively, with the computing heads 59, 60 and 61. Each of these indicator-elements is provided with an upstanding scale-bearing element, said elements being designated, respectively, by the reference characters 243, 244 and 245 (Figs. 3 and 4). These scale-bearing elements are normally located behind the dial-plate 213, and close to an index-opening 246 in said dial-plate, and are positioned at different radial distances from the center about which the sectors rotates, so as to move in adjacent circular paths when the indicator-sectors are rotated. Each of said scale-bearing elements is provided with an indicator-scale comprising three symbols or letters, "S," "N" and "A," indicative of the three states to which its corresponding computing head may be set. By moving the indicator-sectors to different relative positions with respect to the index-opening 246, and thus exposing different ones of the aforesaid symbols at said index-opening, the indicator may be caused to register all the different permutations of states to which the computing heads may be set, said permutations being represented by the symbols carried by the scale-bearing elements as read in a radial direction through said index-opening.

Means may be provided for justifying or alining each of the indicator-sectors in any one of its three indicating positions. For such purpose each sector is provided with three notches 247, one for each indicating position, and a common justifying detent member 248, mounted to the rear face of the bracket 182, (Figs. 3 and 4) and projecting forwardly through an opening therein and through openings 250 in said sectors, is provided with a spring 249 for moving said detent into said notches for accurately positioning said indicator-sectors at each operation. The sector 242 is provided with an opening through which project the scale-bearing elements 243 and 244 of the indicator-elements 240 and 241, and the sector 241 is in like manner provided with an opening through which projects the scale-bearing element 243 of the indicator-element 240, said openings being of sufficient extent to permit free movement of said sectors to their various positions. To permit free relative movement of the sectors 240 241 and 242, with respect to the hub 215, and to reduce the tendency which each member would have to impart a rotation to the other, said members are separated by washers 251. A stop-pin 252 is mounted upon the bracket 205 (Figs. 3 and 4) in a position to be engaged by lugs of the sector-plates 240, 241, 242, when returned to their normal positions.

As a means of indexing, in accordance with predetermined permutations, the states to which it is desired that the computing heads shall be set, and of moving the indicator-sectors to relative positions corresponding with such predetermined states, the following mechanism is employed. Rotatably mounted within brackets 253, 254, (Figs. 5 and 7) is a hollow shaft 255, within which is rotatably mounted a hollow shaft 256, which, in turn, serves as a mounting for a third rotatable shaft 257. Collars 288, 289, fixedly attached to said shaft 255, as by set-screws 290, 291, prevent endwise movement thereof. Said shafts 255, 256, 257, are provided at one end with radial arms 258, 259, 260, respectively, one for each shaft, said arms being connected by suitable pin-and-slot connections 261 (Fig. 3) with rock arms carried by the respective indicator-sectors 240, 241, 242. At their opposite ends, said shafts 255, 256, 257 are provided, respectively, with radially-projecting arms 262, 263, 264, connected, respectively, by links 265, 266, 267 to vertically-depending arms of three bell-crank-levers 268, 269, 270. The vertical arms of said bell-crank-levers 268, 269, 270 are connected by links 271, 272, 273 to vertical arms of three bell-crank-levers 274, 275, 276, the two sets of bell-cranks being mounted for rotation about parallel axes. Connecting the horizontal arms, carried by each of the three pairs of bell-crank-levers 268, 274; 269, 275; 270, 276, are three saddle-shaped links 277, 278, 279, each of which constitutes a cam member for operating a corresponding indicator-sector. It will be apparent that, on depression of the cam member 277, motion will be transmitted, through the intermediary of the bell-cranks 268, 274, links 271, 265, arm 262, rock-shaft 255, and arm 258, to the indicator-sector 240, which will be rocked an amount depending upon the extent of vertical movement which is imparted to the cam member 277. In like manner a vertical movement of either of the cam members 278, 279 will result in a corresponding rocking movement of its connected indicator-sector 241 or 242. It will also be apparent that if means is provided for imparting the proper degree of vertical movement to the cam members 277, 278, 279, when the carriage enters a computing zone, the indicator-sectors, carrying the scale-bearing members 243, 244, 245, may be caused to register at the index 246 any desired permutation of states to which the computing heads should be set for that zone. In order to accomplish the above-indicated result, the cam members 277, 278, 279 are located side by side in position to be engaged by parts constituting operating surfaces or tappets, which may be carried by the typewriter carriage and caused to engage said cam members when the carriage enters a computing zone. These tappets may be attachable at various adjustable positions with respect to the carriage, for the purpose of predetermining the relative positions of the zones in which they will be effective, and the length of the cam members 277 to 279 will determine the width or extent of said zones, which will usually be equal to the length of a computing zone.

In the present embodiment of the invention, the tappets for operating the respective cam members 277, 278, 279, are provided by adding to the tabulator-column-stops 39 the projecting operating surfaces 280, 281, 282 (Figs. 1 and 5), although it is to be understood that separate tappet-carrying plates might be used for such purpose. The extent to which each of the operating surfaces 280, 281, 282 projects downwardly from the column-stop determines in each instance the extent of rotation of the corresponding indicator-sector, as a result of which the surface having the greatest extension will move its sector-plate to register the symbol "A," (see diagram, Fig. 8), whereas the surface of least extension will cause its sector-plate to register the symbol "S." The surface having the extension of intermediate degree will cause its corresponding sector-plate to register the symbol "N." It will now be understood that by providing different tabulator-column-stops with operating surfaces or tappets differing from each other in their relative positions, as by cutting different stops along the broken lines indicated in the diagram shown in Fig. 10, each being cut along a different path, a set of stops may be produced, having the tappets or operating surfaces projecting therefrom in accordance with all the various permutations of states to which the computing heads may be set. Such variously-shaped stops will therefore serve as a set of indexes, and, by the selection and proper placing of any particular one of said indexes upon the tabulator-bar 42, any desired permutation of states may be registered on the indicator when the carriage enters the zone determined by the placing of said index.

As a means of returning the indicator-sectors 240, 241, 242 to their normal positions against the determining stop 252, when the tappets 280, 281, 282 release the cam members 277, 278, 279, springs 284, 285, 286 are provided, one end of each spring being connected to the vertical arm of one of the bell-cranks 268, 269, 270, respectively, and the other end to a pin 283, secured to the machine frame. The relative strength of said springs, with respect to that of the spring 249 (Fig. 4) of the indicator justifying-detent 248, is sufficient to force said detent out of engagement with the notches 247, and return the indicator-sectors to their normal positions.

Figure 5:
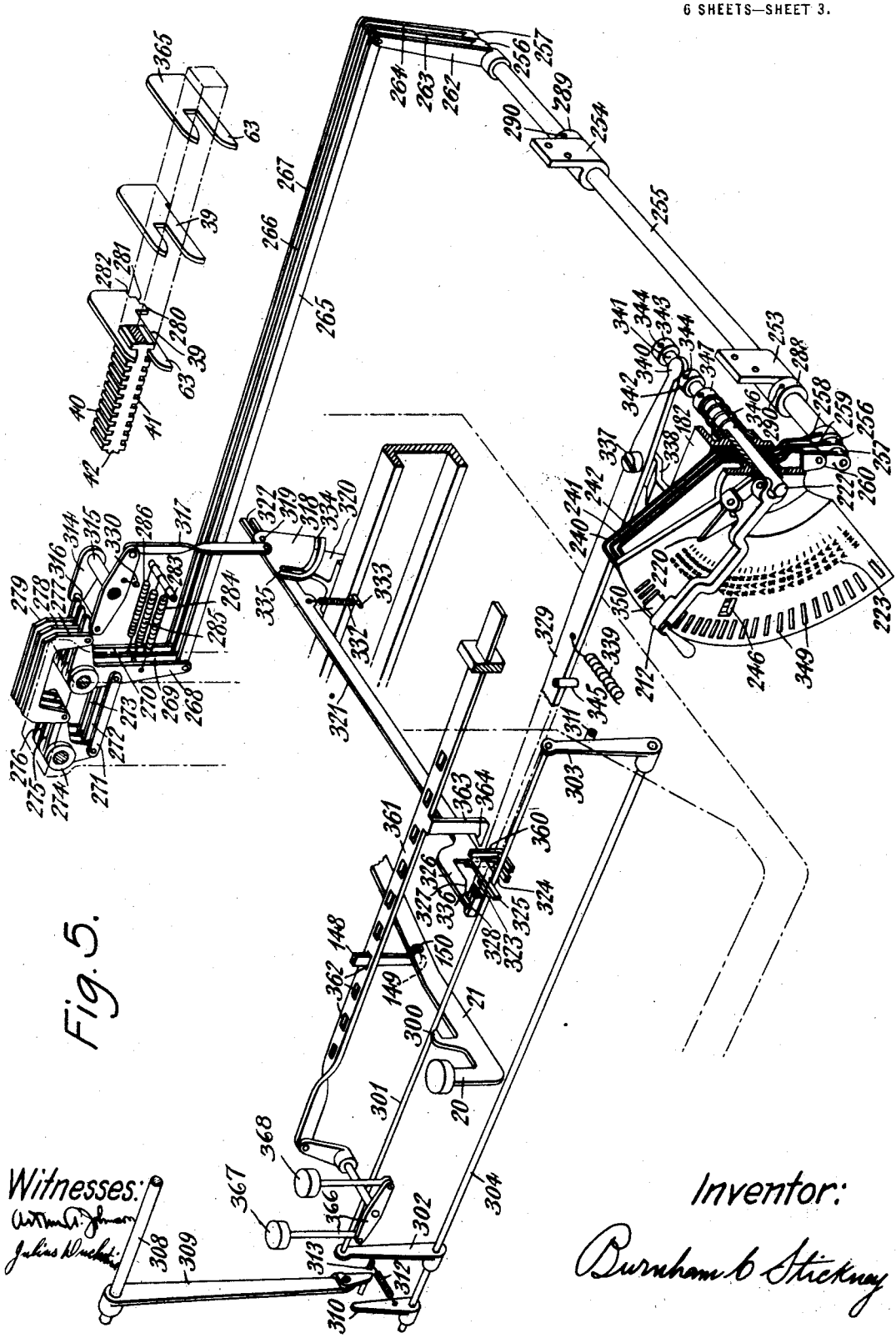
Fig. 5 is a diagram in perspective of certain parts of the invention and their relative positions with respect to the typewriter frame, the latter being indicated in broken lines.

The mechanism may include means for locking the numeral keys when the typewriter carriage travels into a computing zone. For this purpose, use may be made of the ordinary line-lock, such as is fully disclosed in the patent to Pfunder & Cook No. 853,562, issued May 14, 1907. Only such parts of the line-lock of said patent will be described herein as are necessary to make clear its adaptation to the present invention. Each of the numeral keys 20 is provided with a locking element in the form of a hook 300 (Fig. 5). A locking bail 301, carried by radial arms 302, 303, fixedly attached to a rock-shaft 304, is mounted to rotate in bearings carried by the machine frame. When the typewriter carriage 25 reaches the end of a line, a cam 305 (see Fig. 7), carried thereby, engages a cam 306 on an arm 307 carried by a rock-shaft 308 for rocking an arm 309, the end of which is caused to engage an arm 310 (see Fig. 5) to rock the shaft 304, and thus throw the locking bail from its normal position, as shown in Fig. 5, to a position under the locking elements 300 to lock the numeral keys.

The locking bail 301 may be normally held in its unlocked position, with the arm 303 in engagement with a stop 311, by a spring 312, which connects the arm 310 with a pin 313 secured to the machine frame.

To provide for throwing the bail 301 to its locking position with respect to the numeral keys whenever the carriage enters a computing zone, there is provided a rocker 314 (Fig. 5), pivoted at 315 and having at one end a bar 316, so positioned as to be engaged by the horizontal arms of the bell-cranks 268, 269, 270, and moved thereby at each operation of said bell-cranks, when their connected cam members 277, 278, 279, are engaged and moved by the tappets 280, 281, 282. The other end of the rocker 314 is connected by means of a link 317 with a cam 318 pivoted by means of a pin 319 to a bracket 320 secured to the machine frame. A locking bar 321 is provided at its rear end with a slot 322 to form a sliding connection with the pin 319, and at its front end with a guide 360 to prevent sidewise movement thereof, but to permit movement in a vertical plane. The locking bar 321 is therefore free to slide as well as rotate with respect to said pin 319. The front end of said locking bar is in the form of a two-pronged fork, one prong 323 being provided with a shoulder 324 normally resting against the locking bail 301 when said parts are in normal unlocked position, as shown in Fig. 5, and an extension 325 normally resting upon said bail and serving as a means to support the front end of said locking bar. The other prong 326 is provided with a cam surface 327 and an extension 328 normally resting upon one end of a lock-releasing lever 329 pivoted at 337 to a bracket 338 secured to the machine frame. The operation of this lever and its associated parts will hereinafter be described.

To maintain the cam 318 and parts connected therewith, in their normal positions and to return them thereto after each operation, one end of the rocker 314 is connected by means of a spring 330 (see Fig. 9) with the pin 283 secured to the machine frame. A spring 332 (Fig. 5), secured at one end to said locking bar 321, and at the other end to a pin 333, carried by the machine frame, is also provided for normally tending to rotate the locking bar 321 in a counter-clockwise direction, as shown in Fig. 7, to maintain the engagement of the extension 325 with the locking bail 301. The cam 318 is provided with a cam groove 334, which engages a pin 335 on the locking bar 321. The form of said cam groove 334 is such that on movement of the rocker 314 as a result of the engagement of any one of the tappets 280, 281, 282, with its corresponding cam member 277, 278, 279, the locking bar 321 will be moved forwardly to such an extent that the shoulder 324 will move the bail 301 to its locking position under the members 300 of the numeral keys. The effect of this mechanism is such that, whenever the carriage moves into a computing zone, as determined by the placing of one of the column-stops 39, bearing tappets 280, 281, 282, the numeral keys will be locked, and unless released from said lock by means to be hereinafter described, said keys will remain locked until the cam members 277, 278, 279 are released from their engagement with said tappets.

As a means for returning the numeral-key-locking device to its ineffective position to unlock said keys, the lever 329 is provided with a cam surface 336, which, on sufficient rotation of such lever, may engage the cam surface 327 on the locking bar 321 and lift the forward end of said locking bar to release the bail 301 from the shoulder 324, and thus permit the same to be moved, under the influence of the spring 312, to its normal position, clear of the locking elements 300, in which position the bottom of the bar 321 rests upon the bail 301. The lever 329 is normally held in the position shown in Fig. 5, against the stop-pin 345 with its cam 336 slightly separated from the cam 327 on the locking bar by means of a spring 339 secured at one end to said lever and at the other end to any suitable part of the machine frame. The end of said lock-releasing lever 329 opposite to that, which bears the cam 336 is provided with a head 340 resting within a groove 341, between two collars 342, 343, secured to the bar 222 in any appropriate manner, as by set-screws 344. A helical spring 346 (Fig. 4), surrounding said bar, and confined between one end of the hub 315 of the state-setting device, and a collar 347, secured to said bar in any suitable manner, as by a set-screw 348, normally holds said bar 222 in its innermost position, as indicated in Fig. 7, with the connected controller-handle 212 removed from the dial 213. The groove 341 is longer than the width of the head 340, so that on first movement of the controller-handle toward the dial 213, the lock-releasing lever 329 is not moved and will not result in a release of the numeral keys from the locking mechanism. It is only by a complete endwise movement of the controller-handle 212 that the shoulder formed by a collar 343 engages the head 340 to move the lever 329, and, by engagement of the cams 336 and 327, effect the release of the numeral keys.

According to the present invention the complete movement of the controller-handle 212, to release the numeral keys from the locking mechanism, may be prevented unless the state-setting device is first actuated to set the computing heads in accordance with the particular permutation of states which may be registered at the time upon the state-indicator. The mechanism for effecting this result will now be described.

In the face of the dial 213 is a series of radially-disposed slots 349 arranged in the arc of a circle about the center of the axis of the controller-handle 212. These slots, as shown in Figs. 2 and 5, and in the diagram, Fig. 8, are in radial alinement with the symbols of the scale 223 for indicating different positions of the state-setting device, there being one such slot for each radially-disposed set of symbols. On the back of the controller-handle 212, and at a radial distance from its axis corresponding with that of the slot 349, is a rectangular lug 350 of size and shape such as to permit the same to enter one of said slots when the operating handle 212 is moved toward the disk 213. On rotation of the operating handle to the proper position, the lug may be brought into register with any desired one of said slots.

Carried by each of the respective indicator-sectors 240, 241, 242, is a series of lock-out elements. These lock-out elements are located at the periphery of the indicator-sectors just beneath the slots in the dial 213, and serve, by engagement with the lug 350 on the back of the controller-handle 212, to prevent the full movement of said controller-handle in its movement toward the disk, except when said handle is moved to bring its index 220 into registry with the radial group of symbols in the scale 223 corresponding with the permutation of states which may be registered at the time by said indicator-sectors at the index 246. To provide the lock-out elements, for the above-described purpose, each of said indicator-sectors is turned up at its periphery to form an arc-shaped flange, the three flanges, designated 351, 352, 353 (see Fig. 4), being located at radial distances from the axis of the controller-handle 212 such that they will move in neighboring arcuate paths under the slots 349. Each of said flanges 351, 352, 353, is cut away, as indicated diagrammatically in Fig. 8, to form recesses 354, 355, 356 separating lock-out elements 357, 358, 359. The respective lock-out elements on each indicator-sector are so positioned with respect to each other, and with respect to the slots 349 in the dial plate, and with respect to the placing of the symbols "S," "N" and "A" relatively to the index-opening 246, that whenever said indicator-sectors are moved to such relative position as to register a certain permutation of states at the index-opening 246, there will be at least one locking element 357, 358 or 359, under each of the slots 349, except that corresponding with the symbols of the scale 223 representing the same permutation of states. It will therefore be necessary, when the state-indicator has been so set, to move the controller-handle 212 about its horizontal axis until the index 220 registers with the symbols of the scale 223 corresponding with said permutation of states, at which point only it will be possible to move said handle to its full extent in its direction toward the dial 213 to cause the numeral keys to be released by the key-locking mechanism. At this particular point three of the recesses 354, 355 and 356 will be in alinement under the particular slot which the lug 350 will enter when the controller-handle is depressed.

It will be noted that the relative positions of the indicator-sectors 240, 241, 242, with respect to each other, is the same for permutations "S" "S" "S," "N" "N" "N" and "A" "A" "A." Some special provision must therefore be made in arranging the lock-out elements to differentiate these different positions. This has been effected by placing the permutations "S" "S" "S" and "A" "A" "A" at the ends of the scale, so that when the indicator-sectors are positioned to represent one of these groups of symbols, the three alined recesses which correspond with the permutation representing the other will be beyond the slot 349 and at the opposite end. Likewise, the symbols representing "N" "N" "N," and the slot 349 corresponding thereto, have been placed at a distance removed from the others, so that the three recesses corresponding with said symbols will always be covered by a part of the dial plate, except when the three indicator-sectors have been moved to register the permutation "N" "N" "N" at the index-opening 246.

It may be desirable, at times, to typewrite on the work-piece, and within the computing zones, subject-matter including numbers which are not to be computed. At such times it is unnecessary that the computing mechanism should be operated when the numeral keys are depressed. Means may therefore be provided for disconnecting the numeral keys from the computing mechanism whenever it is desired to type-write under such conditions. For such purpose use may be made of key disconnecting mechanism such as that disclosed in the patent to Walter Wright, No. 1,160,102 of November 9, 1915. A bar 361 (see Fig. 12) is provided, having openings 362 therein through which pass the connecting links 148, which couple the levers 21, of the numeral keys 20, with the computing mechanism. The bar 361, as herein disclosed, corresponds with the bar 11 controlled by the lever 17, and keys 18 and 19 (see Fig. 1) of the aforesaid patent, and may be controlled by a similar lever 366 and keys 367, 368 for reciprocating the same. If the bar 361 is moved to the left, as viewed from the front of the machine, the hooks 149 of the links 148 will be disengaged from the openings 150 in the levers 21, and the numeral keys will be disconnected from the computing mechanism. If the bar 361 is moved to the right the connection will be restored. This part of the mechanism is fully described in the aforesaid Patent, No. 1,160,102, and need not, therefore, be set forth with greater particularity here, except to note that in the patent, to which reference is made, the bar 11 must be moved to the right, as viewed from the front of the machine, to disconnect the numeral keys, and to the left to connect them, instead of as above described.

In order that subject-matter including numbers which are not to be computed may be typewritten, when desired, in the computing zones, without disturbing the adjustment of the column-stops bearing the tappets which control the operating mechanism of the key-locking device, means may be provided for rendering said operating mechanism ineffective at such times. For this purpose, the key-disconnecting bar 361 (Fig. 5) is provided with an arm 363 having thereon a cam surface 364 to engage the under side of the locking bar 321 and lift the same on movement of said key-disconnecting bar toward the left from the position shown in Fig. 5. Whenever, therefore, the key-disconnecting bar 361 is moved to the left to disconnect the numeral keys from the computing mechanism, the cam 364 will lift the front end of the locking bar to a position such that the shoulder 324 will be ineffective to operate the key-locking device. When the disconnecting bar 361 is shifted to the right to connect the numeral keys with the computing mechanism, the key-locking device will again be rendered subject to control by the locking bar 321 and its operating mechanism.

The operation of the device, as a whole, should be apparent from the foregoing description of its parts, and need only be summarized. When it is desired that the various heads of the computing mechanism should be set to add, subtract, or remain neutral in accordance with various permutations of such states for different computing zones, but always in accordance with the same permutation for the same zone, the operative will select, from a set of column-stops 39, having tappets 280, 281, 282 thereon, variously positioned, a stop for each of said zones, having tappets corresponding, in their relative arrangement, with the desired permutation of states for said zone. These stops will be placed upon the tabulator bar in positions which will determine the positions of the computing zones. When the carriage enters one of said computing zones, as thus determined, the tappets carried thereby will engage and move cam members 277, 278, 279, and the mechanism connected therewith, to rotate the indicator-sectors of the state-indicator to such relative positions as to register the selected permutation of states for said zone at the index-opening 246. The same operation of said cam members 277, 278, 279, and the mechanism controlled thereby, will be effective to lock the numeral keys. The operative will then rotate the controller-handle 212 until the index 220 registers with that group, of the symbols in the scale 223, corresponding with the particular permutation exhibited at the index-opening 246, thereby causing the state-setting device to set the computing heads in accordance with the same permutation of states. The controller-handle 212 will then be pushed inwardly toward the dial plate to cause the lock releasing mechanism to render the key-locking device ineffective, after which the numeral keys may be operated to enter the desired number. Should an attempt be made to operate the lock-releasing mechanism without first operating the state-setting device to properly set the computing heads, movement of the controller-handle would be prevented by engagement of the lug 350 with one or more of the lock-out elements 357, 358, 359.

It may, at times, be desired to have the computing heads set in accordance with the same permutation of states for computing in two or more successive computing zones. In such case, the operative will select and set a column-stop, having tappets thereon corresponding with said permutation, for operating the various parts of the mechanism in the above-described manner for the first of said zones. It is, however, unnecessary that a similar stop should be used for the following zones, in which no change is to be made in the setting of the computing heads. For use in such cases, there may be provided column-stops 365 (Fig. 5), each having thereon a tappet 63 to coöperate with the latch 64 that controls the movements of the master wheel, but having no projecting portions corresponding to the tappets 280, 281, 282 of the stops 39. This stop 365 will, therefore, coöperate with the latch 64 to determine a computing zone, and, with the decimal stops 38, to serve its purpose as a column-stop, but will ride clear of the cam members 277, 278, 279, without moving them. When, therefore, the carriage enters a computing zone, as determined by one of the stops 365, the mechanism, which controls the movement of the locking bar 321, will not be effective and the numeral keys will therefore not be locked. The numeral keys may, therefore, be immediately operated to enter the number in said zone without any previous movement of the controller-handle of the state-setting and lock-releasing devices.

As shown in the diagram, Fig. 5, the stop nearest the operating mechanism is provided with tappets to register on the state-indicator the permutation "A," "N," "S"; the next stop is of such form as to register on said indicator the permutation "S," "S," "S"; and the third is such as to pass clear of the cam members 277, 278, 279, without moving the same.

When subject-matter, including numbers which are not to be computed, is to be typewritten across parts of the work-piece selected as computing zones by the setting of the column-stops, but without disturbing the setting of said stops, the operative will throw the key-disconnecting bar 361 to the left, thus disconnecting the numeral keys from the computing mechanism, and at the same time rendering the operating mechanism for the key-locking device ineffective. On throwing said key-disconnecting bar to the right, the computing mechanism will again be thrown into action and the keys will be locked whenever the carriage enters a computing zone.

It is not necessary that the column-stops 39 should be used as carriers for the computing-zone-determining tappets 63, or for the tappets 280, 281, 282, of the indicator and lock-operating mechanism. Each set of tappets might be carried by a separate set of stops and the carriage might be provided with a separate notched bar for receiving each set. The form in which the invention is herein disclosed, however, in which a single set of stops is provided to carry all the tappets, is simple and convenient in operation. By so arranging the tappets it is necessary to select and set but one stop for each computing zone which will serve as a means for determining the position of said zone, for bringing the carriage to rest at a particular part of said zone, as determined by the particular tabulator key operated, for locking the numeral keys in said zone, and for setting the permutation state-indicator to register the particular permutation of states to which the computing heads must be set before the locking device can be rendered ineffective, so as to unlock said numeral keys. It should be noted that in order to accomplish the aforesaid results with operating surfaces or tappets carried on a single set of stops, it will be necessary to so position the latch 64, relatively to the decimal stops 38, that when a column-stop 39 is brought up against the decimal stop of highest denominational order, the master wheel will be so positioned, with respect to the computing wheels of the totalizer mechanism, that on operation of a numeral key, the number typewritten thereby will be entered into the computing wheel of highest denominational order. It is also essential that the cam members 277, 278, 279, shall be so positioned relatively to said decimal stops that when the column stop is brought to rest against the decimal stop of highest denominational order, the tappets 280, 281, 282, will engage and move said cam members to effect the locking of the numeral keys and the setting of the state-indicator. The cam members 277, 278, 279, should also be of such length as to maintain coöperative relation with the tappets on the column-stop throughout the entire width of the computing zone.

Variations may be resorted to within the scope of the invention, and portions of the improvements may be used without others.

Having thus described my invention, I claim:

1. In a computing machine, the combination with computing mechanism including a computing head settable to different states, numeral keys therefor, and a traveling carriage, of means controlled by the travel of said carriage into a predetermined zone for locking said keys, means controlled by the travel of said carriage into said zone, for indicating to the operative a predetermined state to which said computing head may be set, means for setting said head to a corresponding state, means for releasing said key-locking means, and means dependent upon the relative positions of said state-setting and state-indicating means, to prevent the actuation of said releasing means except when said computing head is set to the state so indicated.

2. In a computing machine, the combination with computing mechanism including a computing head settable to different states, numeral keys therefor, and a traveling carriage, of means controlled by the travel of said carriage into a predetermined zone for locking said keys, a state indicator bearing designations indicative of a plurality of states to which said computing head may be set, an index therefor, means controlled by the travel of said carriage into said zone for effecting relative movement between said indicator and its index to register a predetermined one of said states, means for setting said head to a corresponding state, means for releasing said key-locking means, and means dependent upon the relative positions of said state-setting and state-indicating means, to prevent the actuation of said releasing means except when said computing head is set to the state so indicated.

3. In a computing machine, the combination with computing mechanism including a computing head settable to different states, numeral keys therefor, and a traveling carriage, of means controlled by the travel of said carriage into any one of a number of predetermined zones for locking said keys, means controlled by the travel of said carriage into any one of said zones for indicating to the operative a predetermined state to which said computing head may be set for said zone, means for setting said head to a corresponding state, means for releasing said key-locking means, and means dependent upon the relative positions of said state-setting and state-indicating means, to prevent the actuation of said releasing means when said carriage is in any one of said zones, except when said computing head is set to the predetermined state for said zone.

4. In a computing machine, the combination with computing mechanism including a plurality of computing heads variably settable to different states, numeral keys therefor, and a traveling carriage, of means controlled by the travel of said carriage into a predetermined zone for locking said keys, means controlled by the travel of said carriage into said zone for indicating to the operative for each of said computing heads a predetermined state to which it may be set for said zone, means for setting said heads to corresponding relative states, means for releasing said key-locking means, and means dependent upon the relative positions of said state-setting and state-indicating means, to prevent the actuation of said releasing means, except when said computing heads are all set to the states so indicated.

5. In a computing machine, the combination with computing mechanism including a plurality of computing heads settable to different states, numeral keys therefor, and a traveling carriage, of means controlled by the travel of said carriage into any one of a number of predetermined zones for locking said keys, means controlled by the travel of said carriage into any one of said zones for indicating to the operative for each of said computing heads a predetermined state to which it may be set for said zone, means for setting said heads to corresponding relative states, means for releasing said key-locking means, and means dependent upon the relative positions of said state-setting and state-indicating means, to prevent the actuation of said releasing means, when said carriage is in any one of said zones, except when said computing heads have all been set to the predetermined states for said zone as indicated.

6. In a computing machine, the combination with computing mechanism including a computing head settable to different states, numeral keys therefor, and a traveling carriage, of a locking device for said keys, a state-indicating device, operating mechanism, including a part carried by said carriage and a part to be engaged thereby on travel of said carriage into a predetermined zone for rendering said locking device effective and for causing said state-indicating device to register a predetermined state to which said computing head may be set, means for setting said head to the state so registered, releasing mechanism for said locking device, and means dependent upon the relative positions of said state-setting and state-indicating means for preventing the actuation of said releasing mechanism except when said computing head is set to said predetermined state.

7. In a computing machine, the combination with computing mechanism including a computing head settable to different states, numeral keys therefor, and a traveling carriage, of a locking device for said keys, a state-indicating device, operating mechanism, including a part carried by said carriage and a part to be engaged thereby on travel of said carriage into a predetermined zone, for rendering said locking device effective and for causing said state-indicating device to register a predetermined state to which said computing head may be set, one of said engaging parts of said operating mechanism being adjustable to various positions for variably predetermining said zone, means for setting said head to the state so registered, releasing mechanism for said locking device, and means dependent upon the relative positions of said state-setting and state-indicating means for preventing the actuation of said releasing mechanism except when said computing head is set to said predetermined state.

8. In a computing machine, the combination with computing mechanism including a computing head settable to different states, numeral keys therefor, and a traveling carriage, of a locking device for said keys, a state-indicating device, operating mechanism, including a part carried by said carriage and a part to be engaged thereby on travel of said carriage into a predetermined zone, for rendering said locking device effective and for causing said state-indicating device to register a predetermined state to which said computing head may be set, one of said engaging parts of said operating mechanism being a member of an interchangeable set having their engaging surfaces differentiated in accordance with different states to be indicated, so that by a selection of a particular member of said set the state to be registered on said indicator may be predetermined, releasing mechanism for said locking device, and means dependent upon the relative positions of said state-setting and state-indicating means for preventing the actuation of said releasing mechanism except when said computing head is set to said predetermined state.

9. In a computing machine, the combination with computing mechanism including a computing head settable to different states, numeral keys therefor, and a traveling carriage, of a locking device for said keys, a state-indicating device, operating mechanism, including a part carried by said carriage and a part to be engaged thereby on travel of said carriage into a predetermined zone, for rendering said locking device effective and for causing said state-indicating device to register a predetermined state to which said computing head may be set, one of said engaging parts of said operating mechanism being a. member of an interchangeable set having their engaging surfaces differentiated in accordance with different states to be indicated, so that by a selection of a particular member of said set the state to be registered on said indicator may be predetermined, said member being adjustable to different positions to predetermine said zone, releasing mechanism for said locking device, and means dependent upon the relative positions of said state-setting and state-indicating means for preventing the actuation of said releasing mechanism except when said computing head is set to said predetermined state.

10. In a computing machine, the combination with computing mechanism including a plurality of computing heads variably settable to different states, numeral keys therefor, and a traveling carriage, of a locking device for said keys, a state-indicating device comprising a plurality of members, one for each computing head, each movable to positions indicative of the states to which a corresponding head may be set, operating mechanism for said indicating device comprising for each member thereof a part carried by said carriage and a part to be engaged thereby on travel of said carriage into a predetermined zone for simultaneously causing the members of said indicating device to register predetermined states to which said computing heads may be set, one set of said engaging parts of said operating mechanism being carried by a single member constituting one of an interchangeable set of indexes, the members of said set having their engaging surfaces variously positioned in accordance with different permutations of states to be indicated, so that by a selection and use of a particular index of said set a corresponding permutation of states to be registered on said indicator may be predetermined, operating mechanism controlled by the travel of said carriage for rendering said locking device effective when said carriage enters said zone, a state-setting device for said computing heads movable to various positions to set said heads in accordance with different permutations of states which may be indexed on said indicator operating mechanism, releasing mechanism for said locking device, and means depending upon the relative positions of said state-setting and state-indicating means for preventing the actuation of said releasing mechanism except when said state-setting device has been moved to the position which is effective to set said heads in accordance with the particular permutations of states registered by the various members of said indicating device.

11. In a computing machine, the combination with computing mechanism including a plurality of computing heads, each settable to a plurality of different states, numeral keys therefor, and a traveling carriage, of means controlled by the travel of said carriage into a predetermined zone for locking said keys, means for releasing said key-locking means, a permutation state-setting device movable to different positions to set said heads in accordance with different permutations of states, a permutation state-indicating device comprising a separate element for each computing head, each element bearing designations corresponding to the different states to which said heads may be set, an index therefor, means controlled by the travel of said carriage into said zone for causing relative movement between said indicator elements and said index to register a predetermined permutation of states for said heads for said zone, and a permutation lock-out mechanism for said key-lock releasing means comprising a plurality of series of lock-out elements, one series for each indicator element, each series being controlled in its movement in accordance with the movement of the corresponding indicator element, said lock-out elements being so disposed relatively to each other that one or more of said elements will obstruct the operation of said key-lock releasing means except when said state-setting device is in position to set said heads in accordance with the permutation of states registered by said indicator.

12. In a combined typewriting and computing machine, the combination with a typewriter including number printing mechanism, keys therefor, and a traveling carriage, computing mechanism controlled by said keys and including a computing head settable to different states, and means for predetermining a computing zone, of means controlled by the travel of said carriage into said zone for locking said keys, means controlled by the travel of said carriage into said zone for indicating to the operative a predetermined state to which said computing head may be set, means for setting said head to a corresponding state, means for releasing said key-locking means, and means dependent upon the relative positions of said state-setting and state-indicating means to prevent the actuation of said releasing means except when said computing head is set to the state so indicated.

13. In a combined typewriting and computing machine, the combination with a typewriter including number printing mechanism, keys therefor, and a traveling carriage, computing mechanism controlled by said keys and including a computing head settable to different states, and means for predetermining a plurality of computing zones, of means controlled by the travel of said carriage into any one of said zones for locking said keys, means controlled by the travel of said carriage into any one of said zones for indicating to the operative a predetermined state to which said computing head may be set for said zone, means for setting said head to a corresponding state, means for releasing said key-locking means, and means dependent upon the relative positions of said state-setting and state-indicating means to prevent the actuation of said releasing means when said carriage is in any one of said zones except when said computing head is set to a predetermined state for said zone.

14. In a combined typewriting and computing machine, the combination with a typewriter including number-printing mechanism, keys therefor, and a traveling carriage, computing mechanism controlled by said keys and including a plurality of computing heads variably settable to different states, and means for predetermining a computing zone, of means controlled by the travel of said carriage into said zone for locking said keys, means controlled by the travel of said carriage into said zone for indicating to the operative for each of said computing heads a predetermined state to which it may be set for said zone, means for setting said heads to corresponding relative states, means for releasing said key-locking means, and means dependent upon the relative positions of said state-setting and state-indicating means to prevent the actuation of said releasing means except when said computing heads are all set to the states so indicated.

15. In a combined typewriting and computing machine, the combination with a typewriter including number-printing mechanism, keys therefor, and a traveling carriage, computing mechanism controlled by said keys and including a plurality of computing heads settable to different states, and means for predetermining a plurality of computing zones, of means controlled by the travel of said carriage into any one of said zones for locking said keys, means controlled by the travel of said carriage into one of said zones for indicating to the operative for each of said computing heads a predetermined state to which it may be set for said zone, means for setting said heads to corresponding relative states, means for releasing said key-locking means, and means dependent upon the relative positions of said state-setting and state-indicating means to prevent the actuation of said releasing means when said carriage is in any one of said zones except when said computing heads have all been set to the predetermined states for said zone as indicated.

16. In a computing machine, the combination with computing mechanism settable to a plurality of different states, keys for operating the same, and a traveling carriage, of a lock for said keys, means for releasing said lock, a state-indicator, and means, including parts operated on the travel of said carriage, for determining zones in which computation may be effected, for locking said keys in each of said zones, and for causing said indicator to register for each zone the state to which the computing mechanism must be set in order that said lock-releasing mechanism may be operated to remove said lock.

17. In a combined typewriting and computing machine, the combination with a typewriter including number printing mechanism, keys therefor, and a traveling carriage, of computing mechanism including operating parts detachably connected to said keys, means controlled by the travel of said carriage into a predetermined zone for locking said keys, means for disconnecting said keys from the operating parts of said computing mechanism, and means operated by said key-disconnecting means for unlocking said key-locking means.

18. The combination with a computing machine having a plurality of computing heads settable to different states and a traveling carriage, of a permutation state-indicator comprising a plurality of indicator members, each bearing designations indicative of said states, a common index for said indicator members, and operating mechanism controlled by the travel of said carriage in letter-spacing direction for causing relative movements between said indicator members and said index, so as to register on said indicator different permutations of the relative states to which said computing heads may be set.

19. The combination with a computing machine having a plurality of computing heads settable to different states, and a traveling carriage, of a permutation state-indicator comprising a plurality of concentrically mounted superposed sectors, an indicator scale on each sector, each scale-bearing designations indicative of said states, a common index for said sectors, and operating mechanism controlled by the travel of said carriage in letter-spacing direction for causing relative movements between said sectors and said index, so as to register on said indicator different permutations of the relative states represented.

20. A permutation state-indicator for a computing machine having a plurality of computing heads settable to different states comprising, in combination, a plurality of superposed concentrically mounted indicator elements, one for each head, each having an indicator scale comprising symbols representing different states, and a common index therefor, said indicator elements being movable relatively to each other and to said index, and said scales being movable in paths adjacent to each other and to said index, so that the symbols of said scales may be caused to register with said index in accordance with different permutations of the states to which said computing heads may be set.

21. A permutation state-indicator for a computing machine having a plurality of computing heads settable to different states comprising, in combination, a plurality of superposed concentrically mounted indicator elements, one for each head, each having an indicator scale comprising symbols representing different states, and a common index therefor, said indicator elements being movable relatively to each other and to said index, the scale-bearing portion of one of said indicator elements being projected through an opening in an overlying indicator element to a position adjacent the scale-bearing portion of said overlying element, so that said scales will be movable in paths adjacent to each other and to said index and so that the symbols of said scales will be caused to register with said index in accordance with different permutations of the states to which said computing heads may be set.

22. A permutation state-indicator for a computing machine having a plurality of computing heads settable to different states comprising, in combination, a plurality of superposed concentrically mounted indicator elements, one for each head, each having an indicator scale comprising symbols representing different states, and a common index therefor, said indicator elements being movable relatively to each other and to said index, the scale-bearing portions of underlying elements being projected through openings in overlying elements to positions such that the scale-bearing portions of all said elements may move in paths adjacent to each other and to said index, so that the symbols of said scales may be caused to register with said index in accordance with different permutations of the states to which said computing heads may be set.

23. The combination with a computing machine including computing mechanism comprising a plurality of computing heads settable to different states, and a traveling carriage, of a permutation state-indicator for indicating, in accordance with various permutations, states to which said computing heads may be set, said state-indicator comprising separate indicator elements, one for each computing head, and operating mechanism for said indicator including movably mounted cam members, one for each indicator element, and a common operating member for said cam members; engagement between said cam members and said common operating member being effected by movement of said carriage in line-spacing direction.

24. The combination with a computing machine including computing mechanism comprising a plurality of computing heads settable to different states, and a traveling carriage, of a permutation state-indicator for indicating, in accordance with various permutations, states to which said computing heads may be set, said state-indicator comprising separate indicator elements, one for each computing head, and operating mechanism for said indicator including movably mounted cam members, one for each indicator element, and a common operating member for said cam members, engagement between said cam members and said common operating member being effected by movement of said carriage in line-spacing direction; said common operating member being attachable in different positions to determine the positions of said carriage at which said indicator will be set.

25. The combination with a computing machine including computing mechanism comprising a plurality of computing heads settable to different states, and a traveling carriage, of a permutation state-indicator for indicating, in accordance with various permutations, states to which said computing heads may be set, said state-indicator comprising separate indicator elements, one for each computing head, and operating mechanism for said indicator including movably mounted cam members, one for each indicator element, and a common operating member for said cam members, engagement between said cam members and said operating member being effected by movement of said carriage in line-spacing direction; said common operating member having tappets or operating surfaces thereon, one for each cam member, which, by their relative positions, determine the permutation of states to be registered on said indicator.

26. The combination with a computing machine including computing mechanism comprising a plurality of computing heads settable to different states, and a traveling carriage, of a permutation state-indicator for indicating, in accordance with various permutations, states to which said computing heads may be set, said state-indicator comprising separate indicator elements, one for each computing head, and operating mechanism for said indicator including movably mounted cam members, one for each indicator element, and a common operating member for said cam members, engagement between said cam members and said operating member being effected by movement of said carriage in line-spacing direction; said common operating member being one of a set of members having cam-engaging tappets varied in their arrangement so that, by the selection and use of the proper one of said set, the permutation of states to be registered on said indicator may be selectively predetermined and indexed by the setting of said operating member.

27. The combination with a computing machine having three computing heads, each settable to three different states, that is, to add, subtract, or remain neutral, of a state-setting device for setting said heads, said device having three cam members, one for each head, and a state-shifter for each head, each shifter having an operative engagement with its respective cam member, said cam members being so shaped as to cause said shifters to set said heads to different states for different positions of said setting device, said cam members being so varied in shape, each with respect to the other, that on movement of said state-setting device to the proper one of a number of predetermined positions, said three heads may be set relatively to each other in accordance with any one of all possible permutations of the three states represented.

28. In a computing machine, the combination with computing mechanism including three computing heads, each settable to three different states, that is, to add, subtract, or remain neutral, of a state-setting device movable to different positions to set said heads, each position being determinative of a different permutation of relative states, the number of different positions of said state-setting device being equal to the number of possible permutations of relative states.

29. The combination with a computing machine having computing mechanism settable to different states, numeral keys therefor, and a traveling carriage, of means, including a part carried by said carriage and a part engaged thereby on movement of said carriage in line-spacing direction, for selectively indicating to the operative any one of a plurality of states to which said mechanism may be set, and means, including a part engaged and operated by a part of said indicating mechanism, for locking said keys at each operation of said indicating means.

30. The combination with a computing machine including computing mechanism comprising a plurality of computing heads settable to different states, numeral keys therefor, and a traveling carriage, of locking mechanism for said numeral keys, a permutation state-indicator for indicating, in accordance with various permutations, states to which said computing heads may be set, said state-indicator comprising separate indicator elements, one for each computing head, operating mechanism for said indicator including movably mounted cam members, one for each indicator element, and a common operating member for said cam members, engagement between said cam members and said operating member being effected on movement of said carriage in line-spacing direction, and operating means for said key-locking mechanism including a part engaged and operated by a part of said indicator-operating means at each operation of said indicator.

31. The combination with a computing machine including computing mechanism settable to different states, and numeral keys therefor, of state-setting mechanism for said computing mechanism, a locking device for said numeral keys, lock-releasing mechanism for said locking device, and a common controller movable in one direction to operate said state-setting mechanism, and in another direction to operate said lock-releasing mechanism.

32. The combination with a computing machine having a traveling carriage and a computing mechanism including computing wheels, and a master wheel to engage and operate the same *seriatim*, said computing mechanism being settable to various states, of a state-indicator for indicating to an operative states to which said computing mechanism may be set, operating mechanism, including a part carried by said carriage and a part engaged thereby on movement of said carriage, to cause relative movement between said master wheel and said computing wheels, operating mechanism, including a part carried by said carriage, and a part engaged thereby on travel of said carriage, to set said state-indicator, said carriage-carried parts of both said operating mechanisms being elements of a single adjustably attachable stop, the positioning of which will predetermine that part of the travel of said carriage which will cause relative movement between said master wheel and said computing wheels, and the form of which will predetermine the state to be registered on said indicator.

33. The combination with a computing machine having numeral keys, a traveling carriage, and computing mechanism including computing wheels and a master wheel to engage and operate the same *seriatim*, of a locking device for said numeral keys, operating mechanism including a part carried by the carriage and a part engaged thereby on movement of said carriage to cause relative movement between said master wheel and said computing wheels, operating mechanism including a part carried by said carriage and a part engaged thereby on travel of said carriage, to render said key lock effective, said carriage-carried parts of both said operating mechanisms being elements of a single adjustably attachable stop, the positioning of which will predetermine that part in the travel of said carriage which will cause relative movement between the master wheel and the computing wheels, and also that part in the travel of said carriage at which the locking device will be rendered effective to lock said keys.

34. In a combined typewriting and computing machine, the combination with a traveling carriage and computing wheels, of a denomination selector for determining the computing zone in which the wheels shall compute, a cam device extending over a range of at least the length of said zone, typewriter keys, a lock for said keys actuable by said cam device, and a tappet on said carriage, associated with the selector and coöperating with said cam device so as to lock said keys in said zone.

35. In a combined typewriting and computing machine, the combination with a traveling carriage and computing wheels, of a denomination selector for determining the computing zone in which the wheels shall compute, a cam device extending over a range of at least the length of said zone, typewriter keys, a lock for said keys actuable by said cam device, a tappet on said carriage, associated with the selector and coöperating with said cam device so as to lock said keys in said zone, a device for controlling the character of the computation, and means operated by said controlling device for unlocking said keys.

36. In a combined typewriting and computing machine, the combination with a traveling carriage and computing wheels, of a denomination selector for determining the computing zone in which the wheels shall compute, a cam device extending over said zone, typewriter keys, a line-locking bail for said keys, a tappet associated with the selector to be effective concomitantly therewith, and coöperating with said cam device, and a rod connected to the cam device to make the bail effective.

37. In a combined typewriting and computing machine, the combination with a traveling carriage and computing wheels, of a denomination selector for determining the computing zone in which the wheels shall compute, a cam device extending over said zone, typewriter keys, a locking bail for said keys, a tappet associated with the selector to be effective concomitantly therewith and coöperating with said cam device, a rod adapted to be pushed against said bail by coöperation of the tappet and cam device to lock the keys, a device for controlling the character of the computation, and means operated by said controlling device for unlocking said keys.

38. In a combined typewriting and computing machine, the combination with a traveling carriage and a computing device, of typewriter keys, a lock for said keys, and a single member settable to select both the zone for computation and the locking zone.

39. In a combined typewriting and computing machine, the combination with a traveling carriage and a computing device, of typewriter keys, key-operated tabulating stops, a lock for the typewriter keys, and a carriage column-tabulating stop settable to select both the locking zone, the computation zone and the place at which the first stops may arrest the carriage.

40. In a combined typewriting and computing machine, the combination with typewriter keys and a traveling carriage, of a normally ineffective key-locking device, a tappet on said carriage, and a cam extending along a limited length of said carriage at an intermediate point in its travel, adapted to be operated by said tappet to hold said key-locking device effective and to release it when clear of the tappet.

41. In a combined typewriting and computing machine, the combination with typewriter keys and a traveling carriage, of a normally ineffective key-locking device, a manually operable controlling device for the computing mechanism, a plurality of cams along the travel of the carriage for controlling said controlling device, a tappet on said carriage for selectively operating said cams, and a bar adapted to be moved by any operated cam to make the key-locking device effective.

42. In a combined typewriting and computing machine, the combination with typewriter keys and a traveling carriage, of a normally ineffective key-locking device, a manually operable controlling device for the computing mechanism, a plurality of cams along the travel of the carriage for controlling said controlling device, a tappet on said carriage for selectively giving said cams various throws to variably control the computing mechanism, and a bar adapted to be moved by any operated cam, irrespective of its throw, to make the key-locking device effective.

43. In a combined typewriting and computing machine, the combination with a traveling carriage and a plurality of computing heads, of typewriter keys, a locking device for said keys, a cam adjacent said carriage for each computing head, a tappet on said carriage for selectively giving said cams various throws, manually operable state-controlling mechanism for each computing head, adapted to be selectively locked by said cams, and a bar operated by any actuated cam, independently of its throw, to hold the locking device effective while the cam is effective.

44. In a combined typewriting and computing machine, the combination with typewriter keys and a traveling carriage, of a normally ineffective key-locking device, a tappet on said carriage, a cam extending along a limited length of said carriage at an intermediate point in its travel, adapted to be operated by said tappet to hold said key-locking device effective and to release it when clear of the tappet, means connecting the computing mechanism and the typewriter keys, a finger-piece for making said means ineffective, and a connection operated by said finger-piece for making the key-locking device ineffective.

45. In a combined typewriting and computing machine, the combination with typewriter keys and a traveling carriage, of a normally ineffective key-locking device, a tappet on said carriage, a cam extending along a limited length of said carriage at an intermediate point in its travel, adapted to be operated by said tappet to hold said key-locking device effective and to release it when clear of the tappet, a computing head in which computations are effected by said keys, and a state-controlling device adapted to make the key-locking device ineffective.

46. In a combined typewriting and computing machine, the combination with numeral keys and a traveling carriage, of a computing head, a normally ineffective lock for said keys, a cam for making said lock effective, a tappet on said carriage for variably throwing said cam, a manual control for said computing head, a blocking device for said control adapted to be variably positioned by said cam, and means adapted to be operated after the control is positioned to unlock the keys.

47. In a combined typewriting and computing machine, the combination with numeral keys and a traveling carriage, of a computing head, connections for enabling the keys to compute in said head, a normally ineffective lock for said keys, a cam, a connection operated by the cam for making said lock effective, a tappet on said carriage for variably throwing said cam, a manual control for said computing head, a blocking device for said control adapted to be variably positioned by said cam, and means adapted to disconnect said keys from said head and simultaneously disable the cam connection to the lock.

48. In a combined typewriting and computing machine, the combination with numeral keys and a traveling carriage, of a plurality of computing heads, a normally ineffective lock for said keys, a cam for each computing head, a plurality of tappets adapted to be variably set on said carriage to variably and selectively move said cams, a manual control for each head, a blocking device for each cam to selectively block the control of its head, a bar for making said lock effective, and means, including a universal bar, to give said first bar a uniform throw irrespective of the cam throws.

49. In a combined typewriting and computing machine, the combination with numeral keys and a traveling carriage, of a plurality of computing heads, a normally ineffective lock for said keys, a cam for each computing head, a plurality of tappets adapted to be variably set on said carriage to variably and selectively move said cams, a manual control for each head, a blocking device for each cam to selectively block the control of its head, a bar for making said lock effective, means, including a universal bar, to give said first bar a uniform throw irrespective of the cam throws, and means for making said first bar ineffective at the selective setting of the control.

50. In a combined typewriting and computing machine, the combination with a traveling carriage and a plurality of computing heads, of a series of cams adjacent said carriage, a tappet on said carriage for variably throwing said cams, a single handle for varying the state of said heads, a pivot for said handle, a series of lugs connected to each cam to be moved thereby, a mounting for said lugs to enable them to swing on said pivot, and a member on said handle adapted to coöperate with said lugs in positioning the handle.

51. In a combined typewriting and computing machine, the combination with a traveling carriage and a plurality of computing heads, of a series of cams adjacent said carriage, a tappet on said carriage for variably throwing said cams, a single handle for varying the state of said heads, a pivot for said handle, a series of lugs connected to each cam to be moved thereby, a mounting for said lugs to enable them to swing on said pivot, a member on said handle adapted to coöperate with said lugs in positioning the handle, said handle mounted to move its pivot axially, typewriter keys, means actuable by said cams to lock said keys, and means for unlocking said keys by axial movement of the pivot.

52. In a combined typewriting and computing machine, the combination with a traveling carriage and computing wheels, of a tappet on said carriage, a manual state-controlling device for said wheels, a blocking device for said state-controlling device, and a cam adapted to be variably positioned by said carriage to make said state-controlling device selectively effective.

53. In a combined typewriting and computing machine, the combination with a traveling carriage and computing wheels, of a tappet on said carriage, a manual state-controlling device for said wheels, a blocking device for said state-controlling device adapted to normally block it, and a cam of limited length adapted to be variably positioned by said carriage during said length to make said state-controlling device selectively effective.

54. In a combined typewriting and computing machine, the combination with a traveling carriage and computing wheels, of a tappet on said carriage, a manual state-controlling device for said wheel, a blocking device for said state-controlling device, a cam adapted to be variably positioned by said carriage to make said state-controlling device selectively effective, typewriter numeral keys for turning said wheel, a normally ineffective lock for said keys, a connection whereby the operation of the cam makes the lock effective, and a connection whereby the state-controlling device, when free of the blocking device, may disable the lock.

55. In a combined typewriting and computing machine, the combination with a traveling carriage and computing wheels, of a tappet on said carriage, a manual state-controlling device for said wheels, a blocking device for said state-controlling device adapted to normally block it, a cam of limited length adapted to be variably positioned by said carriage during said length to make said state-controlling device selectively effective, typewriter numeral keys for turning said wheels, a normally ineffective lock for said keys, a connection whereby the operation of the cam makes the lock effective, and a connection whereby the state-controlling device, when free of the blocking device, may disable the lock.

56. In a combined typewriting and computing machine, the combination with a traveling carriage, a plurality of computing heads, and a plurality of cams adjacent said carriage, of tappets selectively settable on said carriage to be selectively and variably effective on said cams, a manually operable state-control for each of such heads, and a normally concealed device for each cam adapted to be made selectively readable to inform the typist how to set the state control for each head.

57. In a combined typewriting and computing machine, the combination with a traveling carriage and a computing head, of a cam adjacent said carriage, tappets selectively settable to variably move said cam, a state-control for said head, and a normally concealed device adapted to be made selectively readable by said cam to indicate to the typist the proper setting of the state-control.

58. In a combined typewriting and computing machine, the combination with a traveling carriage, a plurality of computing heads, and a plurality of cams adjacent said carriage, of tappets selectively settable on said carriage to be selectively and variably effective on said cams, a manually operable state-control for each of said heads, and a device for each cam adapted to be made selectively readable to inform the typist how to set the state control for each head.

59. In a combined typewriting and computing machine, the combination with a traveling carriage and a computing head, of a cam adjacent said carriage, tappets selectively settable to variably move said cam, a state-control for said head, and a device adapted to be made selectively readable by said cam to indicate to the typist the proper setting of the state-control.

60. In a combined typewriting and computing machine, the combination with a traveling carriage, a plurality of computing heads, and a plurality of cams adjacent said carriage, of tappets selectively settable on said carriage to be selectively and variably effective on said cams, a manually operable state-control for each of said heads, a device for each cam adapted to be made selectively readable to inform the typist how to set the state-control for each head, each of said devices including a plate, said plates being mounted on a common axis for said plates, a handle journaled on said axis, and means connecting said handle to each state-control.

61. In a combined typewriting and computing machine, the combination with a traveling carriage, a plurality of computing heads, and a plurality of cams adjacent said carriage, of tappets selectively settable on said carriage to be selectively and variably effective on said cams, a manually operable state-control for each of said heads, a device for each cam adapted to be made selectively readable to inform the typist how to set the state-control for each head, each of said devices including a plate, said plates having a common axis, a handle journaled on said axis, means connecting said handle to each state-control, typewriter numeral keys, a lock for said keys adapted to be made effective by any operated cam, and means for disabling said lock by operation of the handle.

62. In a combined typewriting and computing machine, the combination with a traveling carriage and a computing head, of a member settable on said carriage to determine where the head shall compute in the travel of the carriage, typewriter numeral keys for effecting the computation, a normally ineffective bail for locking said keys, a bar for moving said bail to effective position, means, including a cam operated by said member, for moving the bar to move the bail, and means for shifting the bar to make it ineffective.

63. In a combined typewriting and computing machine, the combination with a traveling carriage and a cam adjacent thereto covering a limited portion of its travel, of a tappet on said carriage, typewriter numeral keys, a normally ineffective locking device for said keys, a bar for making said device effective, a connection from the cam to move said bar, a spring for returning said bar when the cam frees the tappet, and an indexing device controlled by the cam.

64. In a combined typewriting and computing machine, the combination with a traveling carriage and a plurality of cams adjacent thereto covering a limited portion of its travel, of a tappet on said carriage for selectively moving said cams, typewriter numeral keys, a normally ineffective locking device for said keys, a bar for making said device effective, a connection from the cams to move said bar, a spring for returning said bar when the cams free the tappet, and an indexing device controlled by the cams.

65. In a combined typewriting and computing machine, the combination with a traveling carriage and a cam adjacent thereto having a variable throw covering a limited portion of its travel, of a tappet on said carriage, typewriter numeral keys, a normally ineffective locking device for said keys, a bar for making said device effective, a connection from the cam to move said bar independently of its throw, a spring for returning said bar when the cam frees the tappet, and an indexing device controlled by the cam.

66. In a combined typewriting and computing machine, the combination with a traveling carriage and a plurality of cams of limited length adjacent the carriage, of an indexing device selectively and variably controlled by said cams, a tappet for variably moving the cams, typewriter keys, a normally ineffective bar for locking said keys, a universal bar moved by said cams, and a connection from said universal bar to give the first bar a uniform throw independently of the throw of the cams.

67. In a combined typewriting and computing machine, the combination with a traveling carriage and a cam of limited length adjacent the carriage, of an indexing device variably moved by said cam, typewriter keys, a locking bar for said keys, a tappet for variably moving said cam, and a connection from the cam to give the bar a uniform throw.

68. In a combined typewriting and computing machine, the combination with a traveling carriage and a cam of limited length adjacent the carriage, of an indexing device variably moved by said cam, typewriter keys, a locking bar for said keys, a spring normally holding said bar ineffective, a tappet for variably moving said cam, and a connection from the cam to give the bar a uniform throw against its spring.

BURNHAM C. STICKNEY.

Witnesses:
CATHERINE A. NEWELL,
EDITH B. LIBBEY.